(12) United States Patent
Fuchs et al.

(10) Patent No.: US 8,525,488 B2
(45) Date of Patent: Sep. 3, 2013

(54) METHOD AND DEVICE FOR CHARGING A CAPACITIVE ELEMENT

(75) Inventors: Stefan Fuchs, Stuttgart (DE); Marco Graf, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 805 days.

(21) Appl. No.: 12/530,402

(22) PCT Filed: Mar. 12, 2008

(86) PCT No.: PCT/EP2008/052913
§ 371 (c)(1),
(2), (4) Date: Mar. 30, 2010

(87) PCT Pub. No.: WO2008/116749
PCT Pub. Date: Oct. 2, 2008

(65) Prior Publication Data
US 2010/0045244 A1  Feb. 25, 2010

(30) Foreign Application Priority Data
Mar. 26, 2007  (DE) .......................... 10 2007 014 326

(51) Int. Cl.
*H02J 7/00* (2006.01)
*H02N 2/00* (2006.01)

(52) U.S. Cl.
USPC ..................................... 320/166; 310/316.03

(58) Field of Classification Search
USPC .................................. 320/166; 310/314–319
See application file for complete search history.

(56) References Cited

U.S. PATENT DOCUMENTS

| 7,372,187 B2 | 5/2008 | Augesky |
| 7,415,971 B2 | 8/2008 | Reineke et al. |
| 2007/0183114 A1 * | 8/2007 | Augesky ...................... 361/160 |

FOREIGN PATENT DOCUMENTS

| DE | 102004054109 | 7/2005 |
| DE | 102004037720 | 3/2006 |
| DE | 102005054680 | 6/2006 |
| JP | 2006-144588 | 6/2006 |
| WO | WO 01/33061 | 5/2001 |
| WO | WO 2005/083251 | 9/2005 |

OTHER PUBLICATIONS

International Search Report, PCT International Patent Application No. PCT/EP2008/052913, dated Aug. 14, 2008.

* cited by examiner

*Primary Examiner* — Melissa Koval
*Assistant Examiner* — Daniel Miller
(74) *Attorney, Agent, or Firm* — Kenyon & Kenyon LLP

(57) ABSTRACT

A method and device for charging and/or discharging a capacitive element. A controllable switch is driven to interrupt the charging current when the charging current exceeds a predetermined charging-current threshold. The charging-current threshold is altered while the capacitive element is being charged to the predefined charging voltage. The controllable switch is driven again for coupling the charging current into the capacitive element if a predefined period of time after a previous activation of the controllable switch has elapsed, and/or in case the charging current drops below the predetermined charging-current threshold. A discharging process is carried out correspondingly.

16 Claims, 4 Drawing Sheets

METHOD AND DEVICE FOR CHARGING A CAPACITIVE ELEMENT

FIELD OF THE INVENTION

The present invention relates to methods and devices for charging a capacitive element to a predefined charging voltage, a charging current being coupled into the capacitive element.

BACKGROUND INFORMATION

In various electrotechnical applications, it is often necessary to drive capacitive elements such as capacitors, for example, but also special actuators having capacitances like, in particular, piezoelectric actuators, and to precharge them prior to the actual driving. For example, capacitive control elements such as piezoelectric actuators are used as valve elements in injection systems for internal combustion engines in motor vehicles, since they are precisely controllable and allow a low-consumption injection of fuel into the corresponding combustion chamber.

A driving circuit, which also permits simple methods for charging and discharging piezoelectric actuators, is described in German Patent Application No. 10 2004 037 720 A1, for example. As a rule, the charging current occurring during the charging of piezoelectric actuators must be limited so as not to damage the semiconductor components used. Therefore, usually a pulsed charging current is obtained by switching a charging-current source on and off until the desired charging voltage is reached. After a desired charging voltage of the corresponding piezoelectric actuator has set in, it may be activated as control element in order to enable a valve opening, for example. In this context, it is desirable to be able to determine the characteristic of the charging voltage over time as precisely as possible in operation, in order to be able to carry out the fuel injection for the corresponding engine in a manner beneficial from the standpoint of efficiency.

An object of the present invention is to provide an improved method and devices for charging a capacitive element to a charging voltage.

SUMMARY

An example device according to the present invention may be particularly suited for implementing the method for charging and/or discharging a capacitive element using a charging current or discharging current. In so doing, a controllable switch is driven to interrupt the charging current when the charging current exceeds a predetermined charging-current threshold. The charging-current threshold is altered while the capacitive element is being charged to the predefined charging voltage. The controllable switch is driven again for coupling the charging current into the capacitive element if a predefined period of time after a previous activation of the controllable switch has elapsed, and/or in case the charging current drops below the predefined charging-current threshold.

Owing to the alteration of the charging-current threshold, by controlling the charging current, which may have a pulsed time characteristic, the characteristic of the charging voltage resulting at the capacitive element may be flexibly adapted to the requirements, e.g., given the use of the capacitive element as a piezoelectric actuator. In one charging cycle which, for example, includes repeated activation of the controllable switch, a charging current is obtained which exceeds and drops below the variable current threshold multiple times, and therefore represents a pulsed charging current. As a rule, a realistic controllable switch exhibits a closing delay and an opening delay, so that the current does not change instantaneously in response to activation of the switch, but rather an overshoot and an undershoot of the charging-current threshold occur. For example, the multiple activation may be repeated until a predefined maximum charging-cycle time has elapsed, or the predefined charging voltage is present at the capacitive element. The charging-current threshold may also be denoted as charging-current limit.

Analogous to the charging process, a discharging from an initial charging voltage of the capacitive element to a lower charging voltage, e.g., of 0 V may also be carried out. In so doing, the absolute value of the corresponding discharging current is compared to the appropriate discharging-current threshold, and a pulsed discharge of the capacitive element is performed.

One or more of the following method steps are possible in implementing the example method: provision of the charging current by a charging-current source; generating of one or more control signals for driving the controllable switch; recording of the charging current by suitable measuring signals; comparison of the charging current to the charging-current threshold; recording of the elapsed time as of each activation of the controllable switch as gap time, in doing which, the gap time may be viewed as the interval between the exceeding of or drop below the charging-current threshold by the charging current determined; recording the total time of a charging cycle; generating at least one check signal, e.g., for transfer to an engine management.

In one specific embodiment of the present invention, the method is implemented as a computer program, which gives rise to a program-controlled computing device for executing the same. In this context, it is possible, for instance, to provide the computer program on a storage medium such as flash, floppy, ROM or other common storage media. It may likewise be implemented in an application-adapted or application-specific integrated circuit. In one specific embodiment of the present invention, the device for charging a capacitive element is implemented, for example, as a regulating device for a fuel injection of a motor-vehicle engine, a plurality of valve actuators being provided as capacitive elements having, in each case, a further assigned controllable switch for selection of the same.

BRIEF DESCRIPTION OF THE DRAWINGS

The present invention is explained in greater detail below based on several exemplary embodiments and the figures.

DETAILED DESCRIPTION OF EXAMPLE EMBODIMENTS

Figure 1:
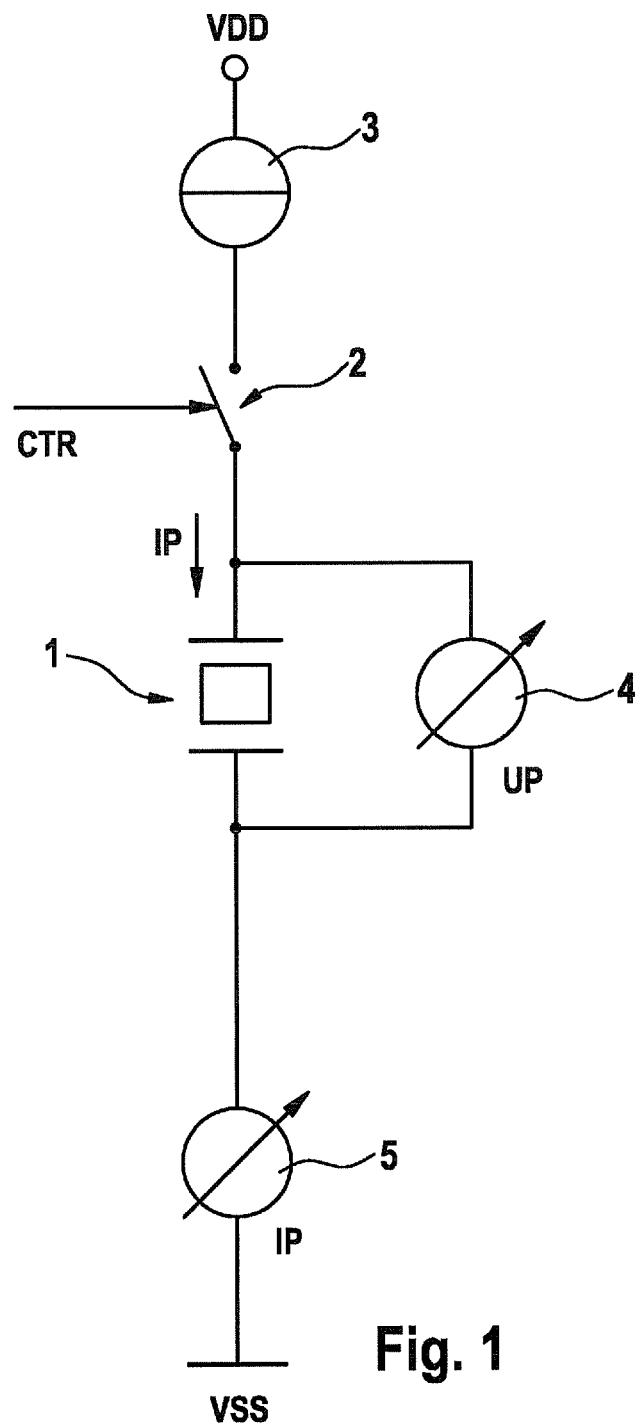
FIG. 1 shows a schematic circuit configuration for clarifying the voltages and currents occurring.

In the figures, identical or functionally-identical elements have been provided with the same reference numerals, provided nothing else has been indicated.

FIG. 1 shows a schematic circuit configuration for the purpose of illustrating the currents and voltages occurring during the charging and/or discharging of a capacitive element. FIG. 1 shows a capacitive element 1 which is represented by way of example as a piezoelectric actuator into which a charging current IP may be coupled. To that end, a charging-current source 3, a controllable switch 2 and piezoelectric element 1 are connected serially between a first electric potential VDD and a second electric potential VSS. Controllable switch 2 is able to be driven by a control signal CTR. For example, switching transistors, driver circuits or other familiar devices which permit the coupling and decoupling of currents are possible as controllable switches.

Also shown by way of example is a voltmeter 4 which measures charging voltage UP present at piezoelectric element 1. A current-measuring device 5, which is provided between second electric potential VSS and the piezoelectric element, measures instantaneous charging current IP. In order to bring piezoelectric element 1 to a predefined charging voltage, a charging current is fed to it by closing controllable switch 2; the charging current may be set to pulsate over time, for instance, by repeated driving of controllable switch 2. After desired charging voltage UP of piezoelectric element 1 is reached or a predefined maximum time for the duration of this charging cycle is exceeded, the charging process is terminated.

Figure 2:
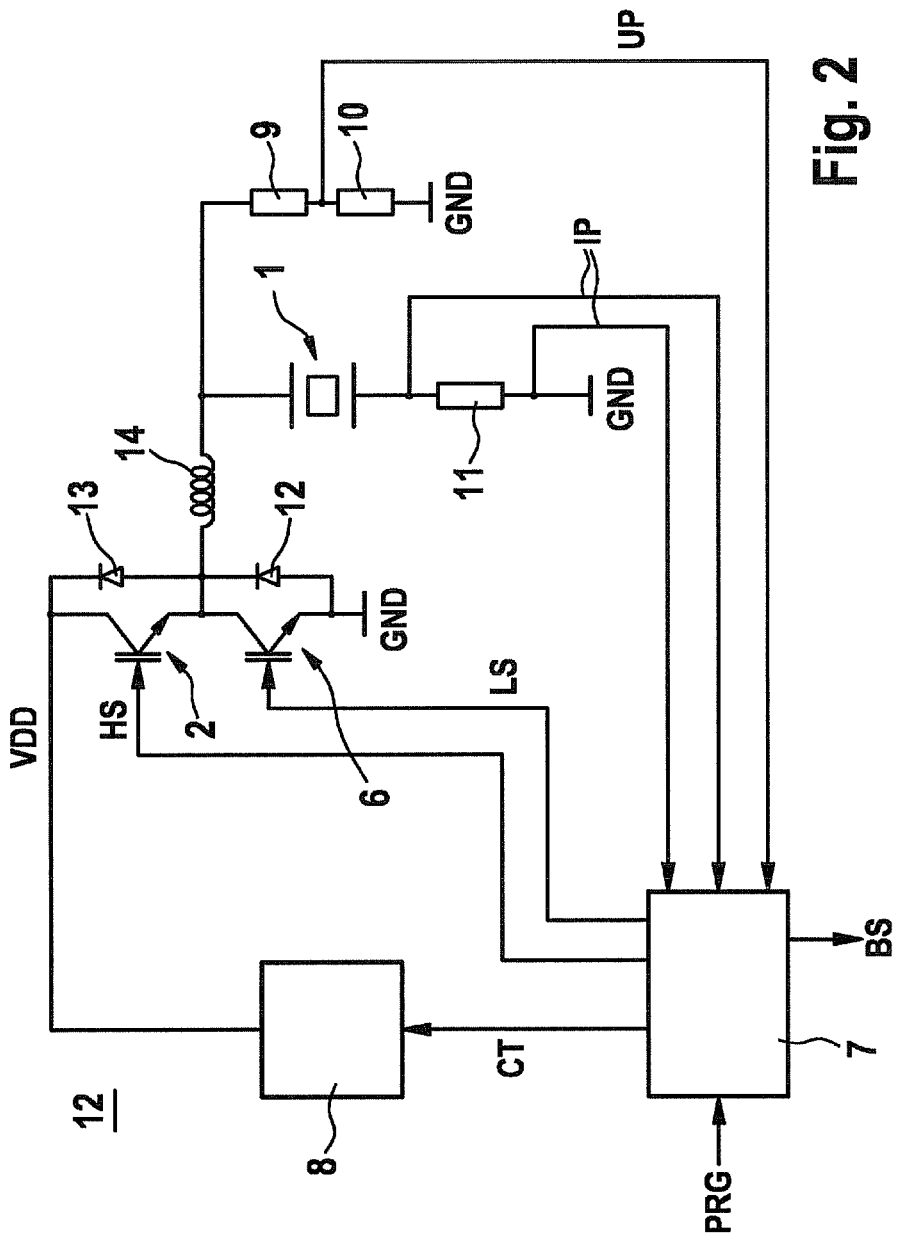
FIG. 2 shows a schematic circuit configuration for charging and discharging a piezoelectric actuator.

A further schematic exemplary embodiment of a device for charging or discharging a capacitive element is shown schematically in FIG. 2. In the device according to FIG. 2, a control device 7 is provided which, for instance, may take the form of an application-specific integrated circuit (ASIC=application-specific integrated circuit) that, by way of control signals HS, LS, drives controllable switches 2, 6 which are implemented as switching transistors, for example.

A single capacitive element 1 is provided merely by way of example as piezoelectric actuator, which is connected via a reactance coil 14 to a line node between the controllable sections of switching transistors 2, 6, and which is connected to ground via a resistor 11. Reactance coil 14 is used for limiting current. Instead of ground connection GND, any potential VSS as desired may be selected, as well. Furthermore, two free-wheeling diodes 12, 13 are connected in parallel to the controllable sections of transistors 2, 6. Charging current IP of the piezoelectric actuator may be determined via resistor 11 and supplied as measuring signals to control device 7. A grounded voltage divider 9, 10 is likewise coupled to the charging node between the controllable sections of switching transistors 2, 6, a charging voltage UP of piezoelectric actuator 1 being able to be tapped off between resistors 9, 10, i.e., a measuring signal UP being able to be acquired which indicates the charging voltage. This measuring signal UP is likewise supplied to control device 7.

The controllable section of first switching transistor 2 is connected between piezoelectric element 1 and a voltage supply 8; voltage supply 8 may be implemented as a controlled d.c.-d.c. converter, for instance, which delivers a supply voltage VDD. The controllable section of second control transistor 6 is connected between piezoelectric element 1 and ground GND. By the controlled closing of first controllable switch 2, thus of the first transistor with the aid of control signal HS, a charging current may be coupled into piezoelectric actuator 1. On the other hand, by opening first controllable switch 2, thus driving transistor 2 in such a way that its controllable section is high-resistance, and at the same time driving second controllable switch 6 via control signal LS in such a way that the controllable section of the second transistor is low-resistance, a discharge of piezoelectric actuator 1 may be achieved.

For instance, control device 7 may be understood as part of a regulating device for the fuel injection of a motor-vehicle engine, piezoelectric element 1 represented singly here by way of example being used as valve actuator. An expansion of circuit configuration 12 is possible, in which further piezoelectric actuators, controllable individually via selector switches, for example, are provided in parallel, and whose respective charging-current intensity IP is able to be acquired and controlled by the regulating device or control device. The control of the charging or discharging process of piezoelectric actuator 1 is explained in greater detail in the following.

Figure 3:
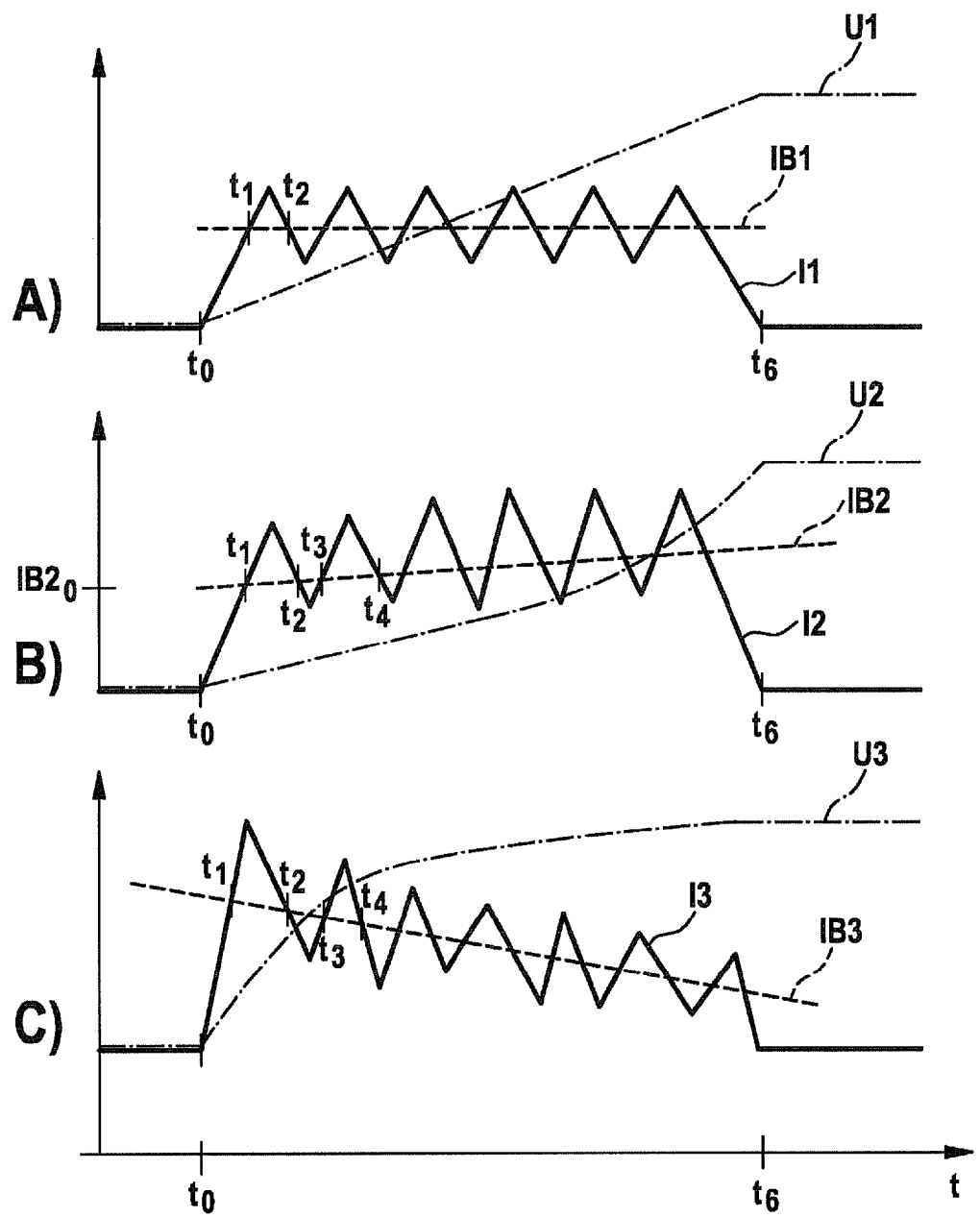
FIG. 3 shows schematic characteristics of charging currents and voltages of a capacitive element.

To that end, several current characteristics and voltage characteristics of charging currents and charging voltages are represented in FIG. 3.

FIG. 3A shows the time characteristic of a charging current I1 (solid-line curve) as well as a resulting charging voltage U1 (dashed-dotted curve), a fixed charging-current threshold IB1 (dashed curve) being selected. At instant $t_0$, the charging current is initially coupled into the piezoelectric element. In so far as the charging current exceeds a fixedly predefined charging-current threshold at instant $t_1$, a controllable switch is opened to limit the charging current. However, due to the inertia of the switch, at first a further rise of the charging current results until it declines and drops below fixed charging-current threshold IB1 at instant $t_2$. In this context, reactance coil 14 may also have a current-limiting effect. Thereupon, the pertinent controllable switch, e.g., the switch of transistor 2 in FIG. 2 is closed, so that after a certain closing delay, the charging current again rises. In using a fixed charging-current threshold IB1 as represented in FIG. 3A, generally a linear charging-voltage rise U1 results due to pulsed charging current I1. The process is repeated until a desired voltage is reached or a predefined maximum charging time has elapsed. For instance, desired predefined charging voltage U1 is reached at an instant $t_6$, and the charging current is interrupted so that it goes back again to virtually 0. For example, the predefined charging voltage may be up to 200V.

In one specific example embodiment of the control, that is, of the method for charging or discharging, the charging-current threshold is now altered during the charging cycle lasting from $t_0$ to $t_6$. In FIG. 3B, a charging-current threshold IB2 is shown which rises during the course of the charging by the repeated feeding and interruption of charging current I2 into piezoelectric element 1. For instance, the rise may be predefined by stipulation of an initial charging-current threshold $IB2_0$ and a gradient for the curve, which is positive in FIG. 3B. Due to changeable charging-current threshold IB2, a voltage characteristic of charging voltage U2 results which is altered compared to FIG. 3A. Charging voltage U2, which is measured through voltage divider 9, 10 by control device 7, has a markedly non-linear characteristic.

A further characteristic of charging current I3 and charging voltage U3 are shown in FIG. 3C, the gradient of variable charging-current threshold IB3 being negative, so that the resulting maxima in the charging current fall in the course of the charging cycle between $t_0$ und $t_6$, thus until predefined desired charging voltage U3 is reached. Time periods $t_6$-$t_0$ of 100-150 microseconds are customary for motor-vehicle applications, thus, the use of the method for charging or precharging capacitive element 1 to a predefined charging voltage, in the course of which, for example, 10 overshoots and undershoots of the charging-current thresholds may occur.

The charging-current characteristic between a specific overshoot and undershoot of the charging-current threshold, e.g., between $t_1$ und $t_2$, is also denoted as (charging- or discharging-) current triangle. The influence of the closing delay and opening delay of controllable switches on the characteristic of the charging current may be discerned more precisely with the aid of FIG. 4.

Figure 4:
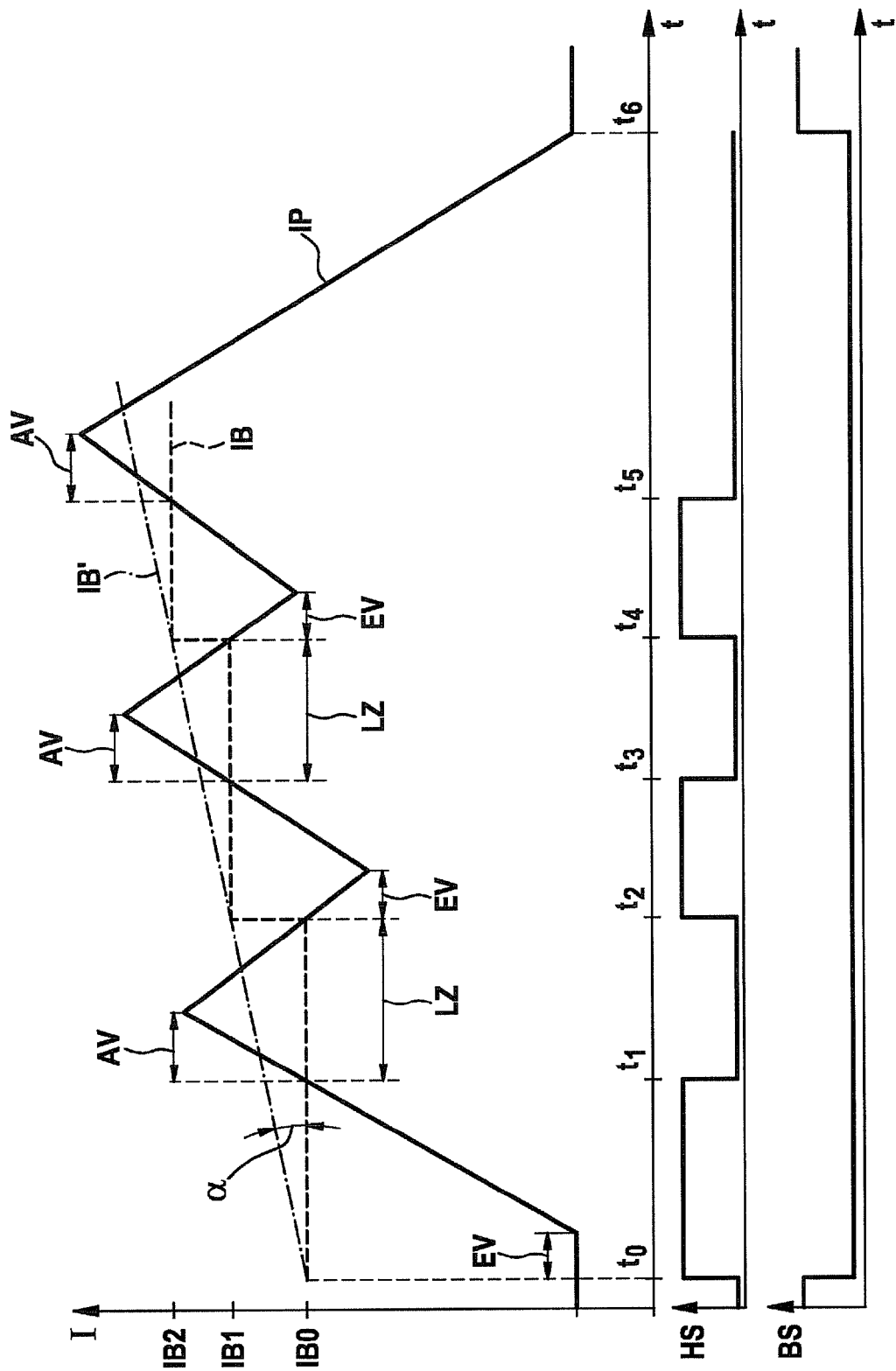
FIG. 4 shows an example for the course of a controlled charging current over time.

FIG. 4 shows the characteristic of a charging current IP as may occur in device 12 of FIG. 2, for instance. A changeable current threshold IB is provided, which has a stepwise characteristic. The stepwise time characteristic of current threshold IB may be obtained, for example, by the quantization of a predefined continuous characteristic IB' of the current threshold, if a digital control of the current data and voltage data takes place in the case of device 7, and therefore a digital-to-analog conversion and analog-to-digital conversion of the continuously existing current and voltage measurements must be implemented.

FIG. 4 first of all shows a current characteristic IP, the possible control signals HS for controllable switch 2 or transistor 2, as well as an indicating signal BS which control device 7 outputs to indicate the duration of the charging cycle to further devices, e.g., the engine management of the vehicle. The closing delay of transistor 2 is indicated by EV, the corresponding opening delay is indicated by AV, and LZ indicates the gap time which denotes the period of time between the driving for opening and closing transistor 2.

At instant $t_0$, control device 7 starts the charging cycle and, for example, sets control signal HS for driving or opening switching transistor 2 to the logical H-level. Transistor 2 therefore completes the circuit. Control device 7 has stored the time characteristic of the charging-current threshold in programmed form, for example, or receives it, for instance, from the engine management via a programming signal PRG in the form of an initial value IB0 and a gradient. After closing delay EV of transistor 2, charging current IP increases and exceeds charging-current threshold IB at instant $t_1$. Control device 7 detects the exceeding of the charging-current threshold at instant $t_1$ and sets control signal HS for switching transistor 2 to logical 0. Beginning at the same time is gap time LZ, which is recorded or predefined by control device 7.

Due to the inertia of switching transistor 2, a further brief rise of the charging current takes place, which then declines and, at instant $t_2$, again drops below charging-current threshold IB, which is recorded by control device 7. In the exemplary embodiment shown, upon each drop of the charging current below the instantaneous charging-current threshold, which in the first charging triangle between $t_1$ and $t_2$ is still IB0, charging-current threshold IB is altered. At instant $t_2$, control device 7 therefore raises the charging-current threshold to the quantized value IB1, which is yielded from gradient α of IB', elapsed time $t_2$ and initial value IB0 according to $IB(t_2)=IB0+(t_2-t_0)\cdot\alpha$. After a brief closing delay EV again, the charging current now increases and exceeds instantaneous charging-current threshold IB once more at instant $t_3$, whereupon, as in the case of the first charging triangle between $t_1$ and $t_2$, the beginning of the gap time is determined and control signal HS for control switch 2 is adjusted, i.e., is set to the logical L-level.

After a drop once again below charging-current threshold IB, it is updated and set to value IB2. At instant $t_5$, charging current IP once more exceeds instantaneous charging-current threshold IB, so that controllable switch 2 is again opened. For instance, the charging cycle is completely brought to an end when either a predefined maximum cycle time has elapsed or the predefined charging voltage of, e.g., 200V has been reached. In FIG. 4, for example, this may be the case after instant $t_5$, so that in the following times of the charging cycle, transistor 2 is not closed again, and after $t_5$, control signal HS remains at the logical L-level. The charging cycle is terminated at instant $t_6$, when the charging current has essentially dropped to zero. The duration of the charging cycle is indicated by signal BS.

Furthermore, it is possible that the drop below the respective instantaneous charging-current threshold is not the sole cause for a renewed coupling-in of the charging current by the closing of transistor 2, but rather that it is also checked whether the one gap-time threshold, thus, a maximum duration of the continuous coupling-in of the charging current has elapsed. A drop below the current threshold and the expiration of the predefined gap-time duration must then be fulfilled as condition for a new closing operation of switch 2.

Due to the changeable charging-current threshold, as already illustrated in FIG. 3, a non-linear characteristic of the charging voltage is obtained, so that, for example, the fuel may be injected more precisely in certain operating situations of the motor vehicle. In the case of a positive gradient of changing charging-current threshold IB, at first a smaller increase in the charging voltage takes place, for example, while the rise is steeper toward the end of the charging cycle. On the other hand, a charging voltage changing rather weakly over time toward the end of the charging cycle may result, as illustrated in FIG. 3C, which may be more favorable for the setting of the ignition points of the engine in certain situations.

Although the present invention was explained in detail based on individual exemplary embodiments, it is not limited to them, but rather may be modified in various ways. In particular, it is not limited only to the charging of a piezoelectric actuator, but rather may be used in varied manner in the case of other capacitive elements. Analogous to the curves shown for a charging process, in the case of the corresponding discharging process, a more favorable change of the discharging voltage over time is obtained using a changeable discharging-current threshold, as well. In the discharging process, as was explained correspondingly based on the example in FIG. 2, second switching transistor 6 is driven to allow a discharging current to flow to ground. In principle, however, the same processes result as for the charging, provided a negative discharging current, thus a discharging of the piezoelectric element is assumed in the figures, and the comparison to the current thresholds is done taking the absolute value of the recorded charging current into account. In addition to the use of the charging or discharging method in fuel-injection systems, where a piezoelectric actuator is employed as valve-setting element, further application fields are also conceivable. Changing the respective charging-current threshold in such a way that a maximum and minimum current limit are predefined is conceivable, as well, so that a current-threshold range is predetermined, within which a change is carried out during the charging or discharging of the capacitive element.

What is claimed is:

1. A method for charging a capacitive element to a predefined charging voltage with the aid of a charging current, comprising:
   driving a controllable switch to interrupt the charging current when the charging current exceeds a predetermined current threshold;
   driving the controllable switch to couple in the charging-current at least one of i) when a predefined period of a time after a previous activation of the controllable switch has elapsed, and ii) when the charging current drops below the predetermined charging-current threshold; and
   altering the charging-current threshold while the capacitive element is being charged to the predefined charging voltage, wherein the charging-current threshold is altered only when the charging current increases after a first activation of the controllable switch and has fallen below the charging-current threshold in response to a following second activation of the controllable switch.

2. The method as recited in claim 1, wherein until the capacitive element reaches the predefined charging voltage, driving the controllable switch repeatedly in such a way that the charging current exceeds and drops below the charging-current threshold multiple times.

3. The method as recited in claim 1, wherein the charging-current threshold is altered in predefined steps.

4. The method as recited in claim 1, wherein the charging-current threshold is altered as a function of a predefined initial value and a pre-defined gradient of the charging current threshold.

5. The method as recited in claim 4, wherein activation of the controllable switch is repeated until at least one of: i) a predefined charging-cycle time has elapsed, and ii) the capacitive element has reached the predefined charging voltage.

6. The method as recited in claim 5, wherein the predefined charging voltage is lower than an instantaneous charging voltage of the capacitive element, an absolute value of the charging current is compared to the charging-current threshold and a pulsed discharge of the capacitive element is implemented using the method.

7. The method as recited in claim 1, further comprising at least one of:
providing the charging current by a charging-current source;
driving the controllable switch to feed the charging current, provided by the charging-current source, to the capacitive element;
generating a control signal for driving the controllable switch;
recording the charging current or a discharging current;
comparing the charging current to the charging-current threshold;
recording a time elapsed as of each activation of the controllable switch as gap time;
comparing gap time to a predefined gap-time threshold;
recording an elapsed charging-cycle time; and
generating a check signal.

8. A non-transitory storage medium storing a computer program, the computer program, when executed by a controller, causing the controller to perform a method for charging a capacitive element to a predefined charging voltage with the aid of charging current, comprising:
driving a controllable switch to interrupt the charging current when the charging current exceeds a predetermined current threshold;
driving the controllable switch to couple in the charging-current at least one of i) when a predefined period of a time after a previous activation of the controllable switch has elapsed, and ii) when the charging current drops below the predetermined charging-current threshold; and
altering the charging-current threshold while the capacitive element is being charged to the predefined charging voltage, wherein the charging-current threshold is altered only when the charging current increases after a first activation of the controllable switch and has fallen below the charging-current threshold in response to a following second activation of the controllable switch.

9. A device for charging or discharging a capacitive element to a pre-defined charging voltage or discharging voltage with the aid of a coupled-in charging current or discharging current, the device included a control circuit adapted to perform the steps of:
driving a controllable switch to interrupt the charging current when the charging current exceeds a predetermined current threshold;
driving the controllable switch to couple in the charging-current at least one of i) when a predefined period of a time after a previous activation of the controllable switch has elapsed, and ii) when the charging current drops below the predetermined charging-current threshold; and
altering the charging-current threshold while the capacitive element is being charged to the predefined charging voltage, wherein the charging-current threshold is altered only when the charging current increases after a first activation of the controllable switch and has fallen below the charging-current threshold in response to a following second activation of the controllable switch.

10. The device as recited in claim 9, wherein the capacitive element includes a piezoelectric actuator.

11. The device as recited in claim 9, wherein the controllable switch has at least one of a predefined closing delay and a predefined opening delay.

12. The device as recited in claim 9, wherein the controllable switch is a switching transistor.

13. The device as recited in claim 12, wherein the switching resistor is one of a MOSFET or an IGBT (insulated gate bipolar transistor).

14. The device as recited in claim 9, wherein the device is a regulating device for a fuel injection of a motor-vehicle engine, a plurality of valve actuators being provided as capacitive elements having in each case, an assigned controllable switch.

15. The device as recited in claim 9, wherein the control circuit receives at least one current-measuring signal and generates control signals for at least one controllable switch.

16. The device as recited in claim 9, wherein the control circuit is able to be programmed and executes a computer program.

* * * * *

UNITED STATES PATENT AND TRADEMARK OFFICE
CERTIFICATE OF CORRECTION

PATENT NO.       : 8,525,488 B2                                            Page 1 of 1
APPLICATION NO.  : 12/530402
DATED            : September 3, 2013
INVENTOR(S)      : Fuchs et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 988 days.

Signed and Sealed this
Fifteenth Day of September, 2015

Michelle K. Lee
*Director of the United States Patent and Trademark Office*